(12) United States Patent
Asselin et al.

(10) Patent No.: US 12,703,488 B2
(45) Date of Patent: Aug. 11, 2026

(54) AIRCRAFT OTTOMAN AND STORAGE CABINET

(71) Applicant: BOMBARDIER INC., Dorval (CA)

(72) Inventors: Marie-Claude Asselin, Bromont (CA); Alexandre Curthelet, Montreal (CA); Louis Lefebvre, Montreal (CA)

(73) Assignee: BOMBARDIER INC., Dorval (CA)

(*) Notice: Subject to any disclaimer, the term of this patent is extended or adjusted under 35 U.S.C. 154(b) by 2 days.

(21) Appl. No.: 18/377,330

(22) Filed: Oct. 6, 2023

(65) Prior Publication Data

US 2025/0115360 A1 Apr. 10, 2025

(51) Int. Cl.
*B64D 11/06* (2006.01)

(52) U.S. Cl.
CPC ...... *B64D 11/0643* (2014.12); *B64D 11/0602* (2014.12); *B64D 11/0627* (2014.12)

(58) Field of Classification Search
CPC ......... A47C 3/16; A47C 16/02; A47C 16/025; B64D 11/0643
See application file for complete search history.

(56) References Cited

U.S. PATENT DOCUMENTS

D274,676 S 7/1984 Massonnet
D281,208 S 11/1985 Raftery
5,466,041 A * 11/1995 Hoffman ................ A47C 13/00 297/188.1
D411,689 S 6/1999 Papaioannou et al.
D461,061 S 8/2002 Kent
D485,093 S 1/2004 de Blois
D557,910 S 12/2007 Saunders
7,581,786 B1 * 9/2009 Wang ....................... A47C 7/62 297/DIG. 6
D610,818 S 3/2010 Crane
D615,020 S 5/2010 Bock
D688,050 S 8/2013 Gologorsky
D693,135 S 11/2013 Fitzpatrick
D699,456 S 2/2014 Bosman
D727,044 S 4/2015 Tu
D839,009 S 1/2019 Garbus
D866,208 S 11/2019 Chan
D917,902 S 5/2021 Guthrie
11,130,578 B1 * 9/2021 Dowty ................... B64D 11/06

(Continued)

FOREIGN PATENT DOCUMENTS

EP 015036748-0001 1/2024

OTHER PUBLICATIONS

"Introducing the Executive Cabin", https://www.youtube.com/watch?v=9Cm8KliDg54&t=30s, Accessed Sep. 16, 2025, Published Oct. 17, 2022 (Year: 2022).*

(Continued)

*Primary Examiner* — Eric J Kurilla
(74) *Attorney, Agent, or Firm* — Norton Rose Fulbright Canada LLP

(57) ABSTRACT

Aircraft furniture including ottomans and associated storage cabinets are provided. An ottoman includes a first outer shell including a first base and two first sides extending from the first base to define a first U shape, and a second outer shell including a second base and two second sides extending from the second base to define a second U shape. The first outer shell and the second outer shell are fitted together to define the ottoman.

11 Claims, 8 Drawing Sheets

(56) References Cited

U.S. PATENT DOCUMENTS

| | | | | |
|---|---|---|---|---|
| 2008/0007091 | A1 | 1/2008 | Lechkun | |
| 2008/0054770 | A1* | 3/2008 | Greiner | A47C 7/62 312/235.2 |
| 2008/0265631 | A1* | 10/2008 | Quicoy | A47C 16/02 297/42 |
| 2012/0126595 | A1* | 5/2012 | Petrucci | A47C 3/02 297/282 |
| 2019/0200770 | A1* | 7/2019 | Lan | A47C 9/002 |
| 2022/0211184 | A1* | 7/2022 | Tompkin | A61H 9/0078 |
| 2022/0258866 | A1 | 8/2022 | Wills | |
| 2023/0021185 | A1* | 1/2023 | Guthrie | B64D 11/0647 |
| 2025/0115360 | A1 | 4/2025 | Asselin | |

OTHER PUBLICATIONS

Ultimate Jet, NBAA 2022: Bombardier introduces new interior for Global 7500 & Global 8000, Oct. 17, 2022 [online], retrieved Sep. 12, 2025 from URL: https://ultimatejet.com/nbaa-2022-bombardier-introduces-new-cabine-for-global-7500-global-8000/ (Year: 2022).

Kington, Video: Executive cabin unveiled for Global 7500 and Global 8000, avail. in businessjetinteriorsinternational.com, pub. Oct. 19, 2022 [online], retrieved Apr. 11, 2025 from URL: https://www.businessjetinteriorsinternational.com/news/interior-design/executive-cabin-unveiled-for-global-7500-and-global-8000.html (Year: 2022).

* cited by examiner

26A
D2
26
12
14
26B
24C
24B
28
24
24A
26C

28
G
6
24C
14
26
26A
24
D1
24A
26B
D2
12
D3
6
26C
24B

26A
A
26C
26
26B
24C
24B
24
24A 28
36
26,34
42
40
44
38
A
24,30
28
38
26B
34
26A
24C
46
24A
32
30
36
38
26C 16
88
14
12
86
82
12
96
22
80
84
90
94

16
88
82
84
14
92
98
12
86
22
80
12
90
94

16
82
88
84
14
100
92
98
86
94
80
100
22
90

AIRCRAFT OTTOMAN AND STORAGE CABINET

TECHNICAL FIELD

The disclosure relates generally to aircraft furniture, and more particularly to aircraft ottomans and associated storage cabinets.

BACKGROUND

Business aircraft are typically designed for transporting small groups of people. Due to the limited space available onboard business aircraft, it can be challenging to design a cabin interior space that promotes passenger comfort, collaboration, productivity and networking with fellow passengers. Improvement is desirable.

SUMMARY

In one aspect, the disclosure describes an ottoman comprising:

- a first outer shell including a first base and two first sides extending from the first base to define a first U shape; and
- a second outer shell including a second base and two second sides extending from the second base to define a second U shape, the first outer shell and the second outer shell being fitted together so that:
- the first base is opposing the second base;
- the two first sides are perpendicular to the two second sides;
- the two second sides are received between the two first sides; and
- a gap is defined between the first base of the first outer shell and one of the second sides of the second outer shell, the gap defining a first recessed handle for handling the ottoman.

A second gap may be defined between the first base of the first outer shell and another of the second sides of the second outer shell. The second gap may define a second recessed handle for handling the ottoman.

A first overall dimension of the ottoman along a first direction perpendicular to the first base of the first outer shell may be different from a second overall dimension of the ottoman along a second direction perpendicular to the first direction.

The first overall dimension may be smaller than the second overall dimension.

The second overall dimension may be perpendicular to the first sides of the first outer shell.

The first overall dimension may be between 50% and 90% of the second overall dimension.

The first overall dimension may be between 70% and 89% of the second overall dimension.

The second base of the second outer shell may define a first floor-engaging surface for using the ottoman in a first orientation. One of the first sides of the first outer shell may define a second floor-engaging surface for using the ottoman in a second orientation.

In the first orientation, the ottoman may have a first overall height. In the second orientation, the ottoman may have a second overall height greater than the first overall height.

The first outer shell and the second outer shell may be fitted together to cooperatively define a cuboid.

Embodiments may include combinations of the above features.

In another aspect, the disclosure describes an article of aircraft furniture comprising:

- an ottoman storage cabinet including:
- a frame defining an ottoman storage volume and an opening to the ottoman storage volume; and
- a drawer including an ottoman carrier, the drawer being movable in and out of the opening of the frame between a stowed position where the ottoman carrier is at least partially received into the ottoman storage volume and a deployed position where the ottoman carrier is at least partially outside of the ottoman storage volume; and
- an ottoman supported by the ottoman carrier.

The ottoman carrier may include a tray.

The ottoman may be a first ottoman. The article of aircraft furniture may include a second ottoman supported by the ottoman carrier.

The ottoman carrier may include a tray. The tray may include a divider disposed between the first ottoman and the second ottoman.

The drawer may be movable horizontally relative to the frame when the ottoman storage cabinet is in an in-use orientation.

The article of aircraft furniture may include a latch for releasably locking the drawer to the frame.

The ottoman may include: a first outer shell including a first base and two opposing first sides extending from the first base to define a first U shape; and a second outer shell including a second base and two opposing second sides extending from the second base to define a first U shape, the first outer shell and the second outer shell being fitted together to define a cuboid.

Embodiments may include combinations of the above features.

In a further aspect, the disclosure describes an aircraft cabin comprising:

- a floor; and
- an ottoman resting on the floor, the ottoman including:
- a first outer shell including a first base and two opposing first sides extending from the first base to define a first U shape; and
- a second outer shell including a second base and two opposing second sides extending from the second base to define a first U shape, the first outer shell and the second outer shell being fitted together so that:
- the first base is opposing the second base;
- the two first sides are perpendicular to the two second sides; and
- the two second sides are received between the two first sides;
- wherein:
- in a first in-use orientation of the ottoman, the ottoman has a first overall height from the floor; and
- in a second in-use orientation of the ottoman perpendicular to the first in-use orientation, the ottoman has a second overall height from the floor different from the first overall height.

A gap may be defined between the first base of the first outer shell and one of the second sides of the second outer shell. The gap may define a recessed handle for handling the ottoman.

The aircraft cabin may include an ottoman storage cabinet for storing the ottoman.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIG. 9 is a perspective view of the ottoman storage cabinet of FIG. 5 with the drawer thereof partially cut away.

DETAILED DESCRIPTION

The present disclosure describes aircraft cabins and aircraft furniture that, in some embodiments, may help promote passenger comfort, collaboration, productivity and networking with fellow passengers. In some embodiments, a relatively versatile ottoman as described herein may be moved about the aircraft cabin during flight and used as a seat, stool, bench or small table for example. In some embodiments, the ottoman may be used in a plurality of orientations providing different overall heights for accommodating different uses. When not in use, the ottoman may be stored in a storage cabinet, which may also be used as a table, counter or bench for example.

Aspects of various embodiments are described through reference to the drawings.

The term "attached" may include both direct attachment (in which two elements contact each other) and indirect attachment (in which at least one additional element is located between the two elements). The term "substantially" as used herein may be applied to modify any quantitative representation which could permissibly vary without resulting in a change in the basic function to which it is related.

Figure 1:
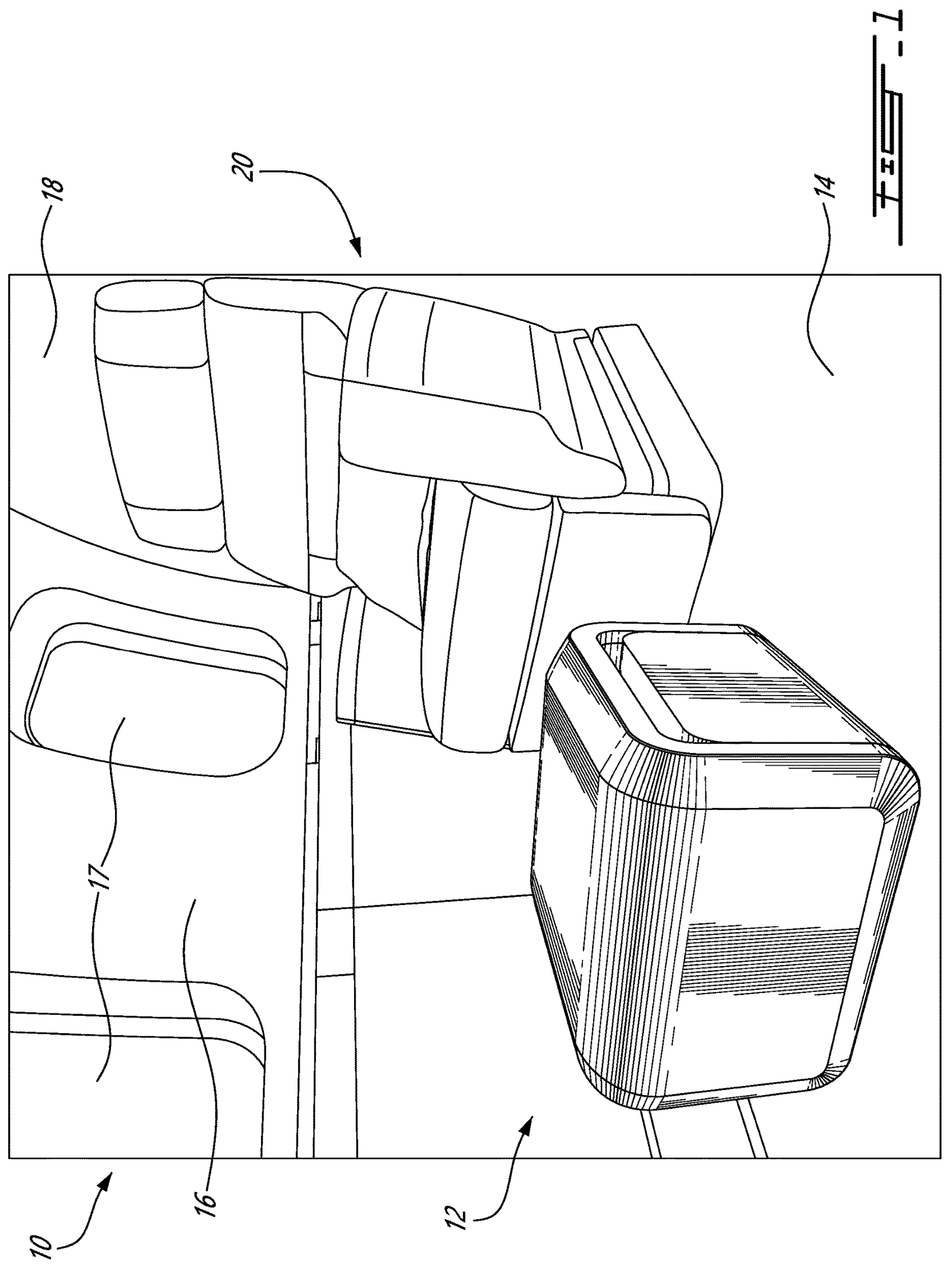
FIG. 1 is a perspective view of an interior of an aircraft cabin including an ottoman as described herein.

FIG. 1 is a perspective view of an interior of aircraft cabin 10 including ottoman 12 as described herein. Aircraft cabin 10 may be part of any manned aircraft such as corporate, private, commercial (e.g., passenger) aircraft for example. In some embodiments, aircraft cabin 10 may be part of a business jet for example.

Aircraft cabin 10 may be configured to accommodate one or more passengers therein and may also be referred to as a "passenger cabin". Aircraft cabin 10 (referred hereinafter as "cabin 10") may include floor 14, wall(s) 16 lining an interior side of a fuselage of the aircraft, window(s) 17, and bulkhead(s) 18 which may serve as room partitions within cabin 10. Cabin 10 may also include one or more articles of furniture resting on floor 14 such as one or more ottomans 12, one or more chairs 20, one or more ottoman storage cabinets 22 (shown in FIGS. 7-9), and one or more tables (not shown) for example.

Figures 2A, 2B:
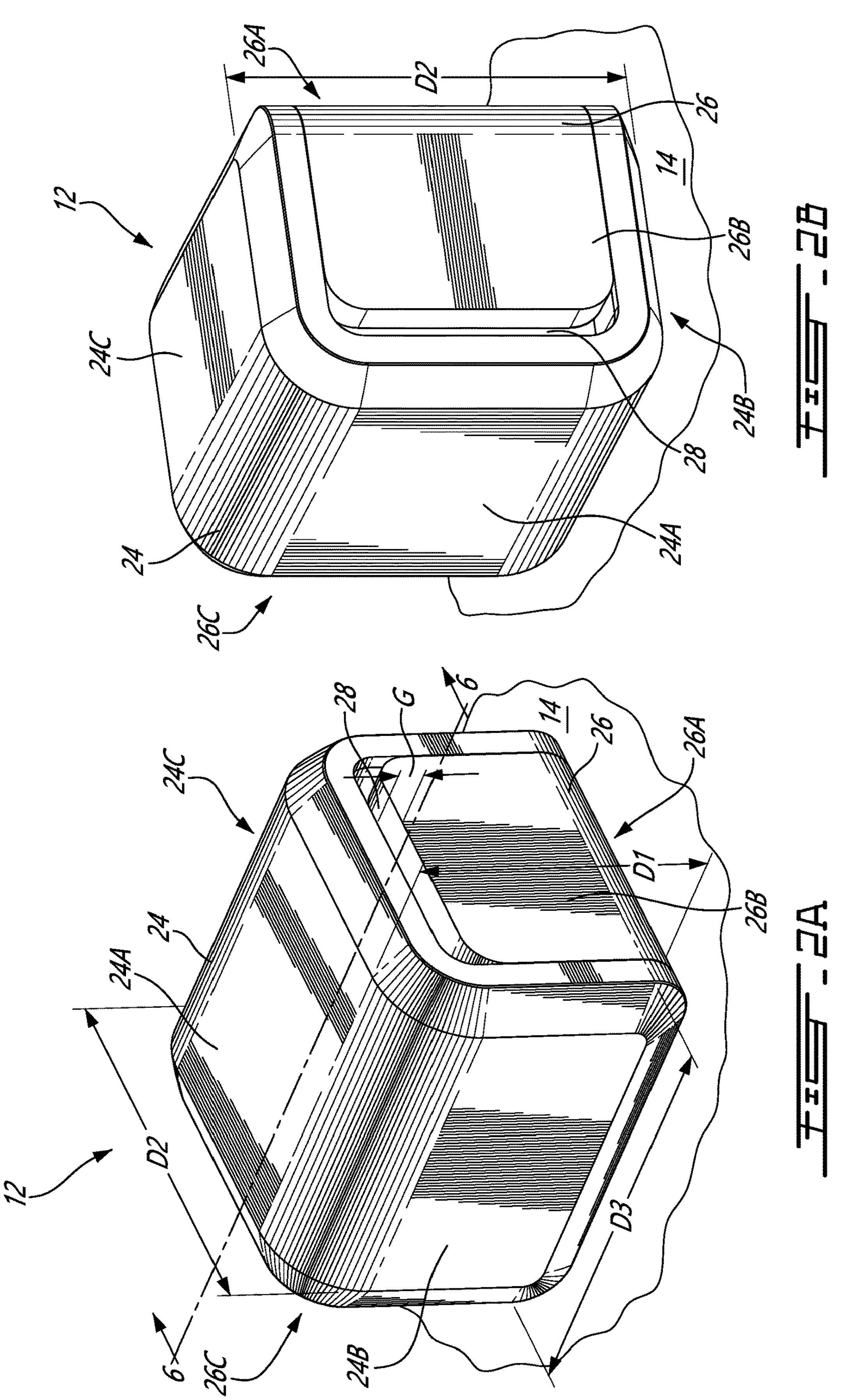
FIG. 2A is a perspective view of the ottoman of FIG. 1 being used in a first orientation.
FIG. 2B is a perspective view of the ottoman of FIG. 1 being used in a second orientation.

FIGS. 2A and 2B are perspective views of ottoman 12 being used in two exemplary in-use orientations. Ottoman 12 may include first outer shell 24 including first base 24A and two opposing first sides 24B, 24C extending from first base 24A to define a first U shape. First sides 24B, 24C may be parallel to each other and be spaced apart from each other. Ottoman 12 may include second outer shell 26 including second base 26A and two opposing second sides 26B, 26C extending from second base 26A to define a second U shape. Second sides 26B, 26C may be parallel to each other and be spaced apart from each other.

First outer shell 24 and second outer shell 26 may be fitted together to define a generally cuboid outer shape of ottoman 12 optionally with rounded edges. For example, first outer shell 24 and second outer shell 26 may be separately manufactured and subsequently assembled together in a mating engagement to define the cuboid shape. For example, first outer shell 24 may define three out of six planar outer surfaces of ottoman 12, and second outer shell 26 may define the other three out of six planar outer surfaces of ottoman 12. In some embodiments, first outer shell 24 and second outer shell 26 may be sized and fitted together to define a square cuboid (i.e., cube) shape with rounded edges. In some embodiments, first outer shell 24 and second outer shell 26 may be sized and fitted together to cooperatively define a rectangular cuboid (i.e., right rectangular prism) shape with rounded edges.

In their assembled state, first outer shell 24 and second outer shell 26 may be oriented so that first base 24A is opposing (i.e., facing) and spaced apart from second base 26A. For example, an inner surface (i.e., facing toward an interior of ottoman 12) of first base 24A may be facing, be parallel to and be spaced apart from an inner surface of second base 26A. First outer shell 24 and second outer shell 26 may be oriented so that first sides 24B, 24C are perpendicular to second sides 26B, 26B. In some embodiment, the first U shape of first outer shell 24 may be larger than the second U shape of second outer shell 26. When first outer shell 24 and second outer shell 26 are fitted together, second sides 26B, 26C may be received between first sides 24B, 24C.

In some embodiments, ottoman 12 may include one or more handles 28 to facilitate handling and manipulation of ottoman 12 about aircraft cabin 10. In some embodiments, handle(s) 28 may be recessed handle(s). FIGS. 2A and 2B show only one handle 28 but another handle 28 having the same or other configuration may be disposed on an opposite side of ottoman 12. In some embodiments, first outer shell 24 and second outer shell 26 may cooperatively define handle 28. For example, first outer shell 24 and second outer shell 26 may be sized so that gap G is defined between first base 24A of first outer shell 24 and one of second sides 26B, 26C of second outer shell 26. Handle 28 may be defined by gap G. In embodiments where ottoman 12 has an opposite side which is a mirror image of or which is similarly configured as the side including handle 28, another gap G may be defined on the opposite side of ottoman 12 between first base 24A of first outer shell 24 and the other of second sides 26B, 26C of second outer shell 26. The other handle 28 on the opposite side of ottoman 12 may be defined by such other gap G.

As shown in FIGS. 2A and 2B, ottoman 12 may be used in a plurality of orientations to promote versatility and facilitate utilization as an ottoman, bench, stool and/or small table for example. In some embodiments of ottoman 12, the different orientations of ottoman 12 may provide different overall heights from floor 14 to accommodate the different uses. Second base 26A of second outer shell 26 may define a floor-engaging outer surface for using ottoman 12 in the exemplary orientation shown FIG. 2A so that ottoman 12 may have a height from floor 14 corresponding to overall dimension D1. First side 24B of first outer shell 24 may also define a floor-engaging outer surface for using ottoman 12 in the exemplary orientation shown in FIG. 2B so that ottoman 12 may have a height from floor 14 corresponding to overall dimension D2 where dimension D2 is greater than dimension D1 (i.e., D2>D1).

In various embodiments, two or more (e.g., all) of the six outer planar surfaces of ottoman 12 may suitable for engaging with floor 14 so that two or more in-use orientations of ottoman 12 may be possible. In some embodiments where orthogonal overall dimensions D1, D2 and D3 are all different, ottoman 12 may have the ability to provide up to three heights from floor 14 depending on the orientation of ottoman 12. For example first overall dimension D1 of ottoman 12 along a first direction perpendicular to first base 24A of first outer shell 24 may be different from second overall dimension D2 of ottoman 12 along a second direction perpendicular to first direction D1. Second overall dimension D2 may be perpendicular to first sides 24B, 24C of first outer shell 24. First overall dimension D1 may be smaller than second overall dimension D2 (i.e., D1<D2). In some embodiments, third overall dimension D3 may be perpendicular to both first overall dimension D1 and to second overall dimension D2. In some embodiments, third overall dimension D3 may be greater than first overall dimension D1 (i.e., D3>D1). In various embodiments, third overall dimension D3 may be substantially equal to second overall dimension D2 (i.e., D3=D2), third overall dimension D3 may be smaller than second overall dimension D2 (i.e., D3<D2), or third overall dimension D3 may be greater than second overall dimension D2 (i.e., D3>D2). In embodiments where ottoman 12 has a generally square cuboid (i.e., cube) shape, overall dimensions D1, D2 and D3 may be substantially equal (i.e., D1=D2=D3).

The aspect ratio of ottoman 12 may be selected based on the intended utilizations of ottoman 12. In various embodiments, first overall dimension D1 may be between 50% and 90% of second overall dimension D2. In some embodiments, first overall dimension D1 may be between 70% and 89% of second overall dimension D2. In some embodiments, a dimension for D1 of 14 to 16 inches (35 to 40 cm) works well for footrest applications, ensuring optimal leg support and relaxation. In some embodiments, a dimension for D2 ranges between 18 to 20 inches (45 to 50 cm). This dimension for D2 allows for easy access to items placed on the ottoman while maintaining a comfortable height for placing drinks or snacks.

Figures 3, 4:
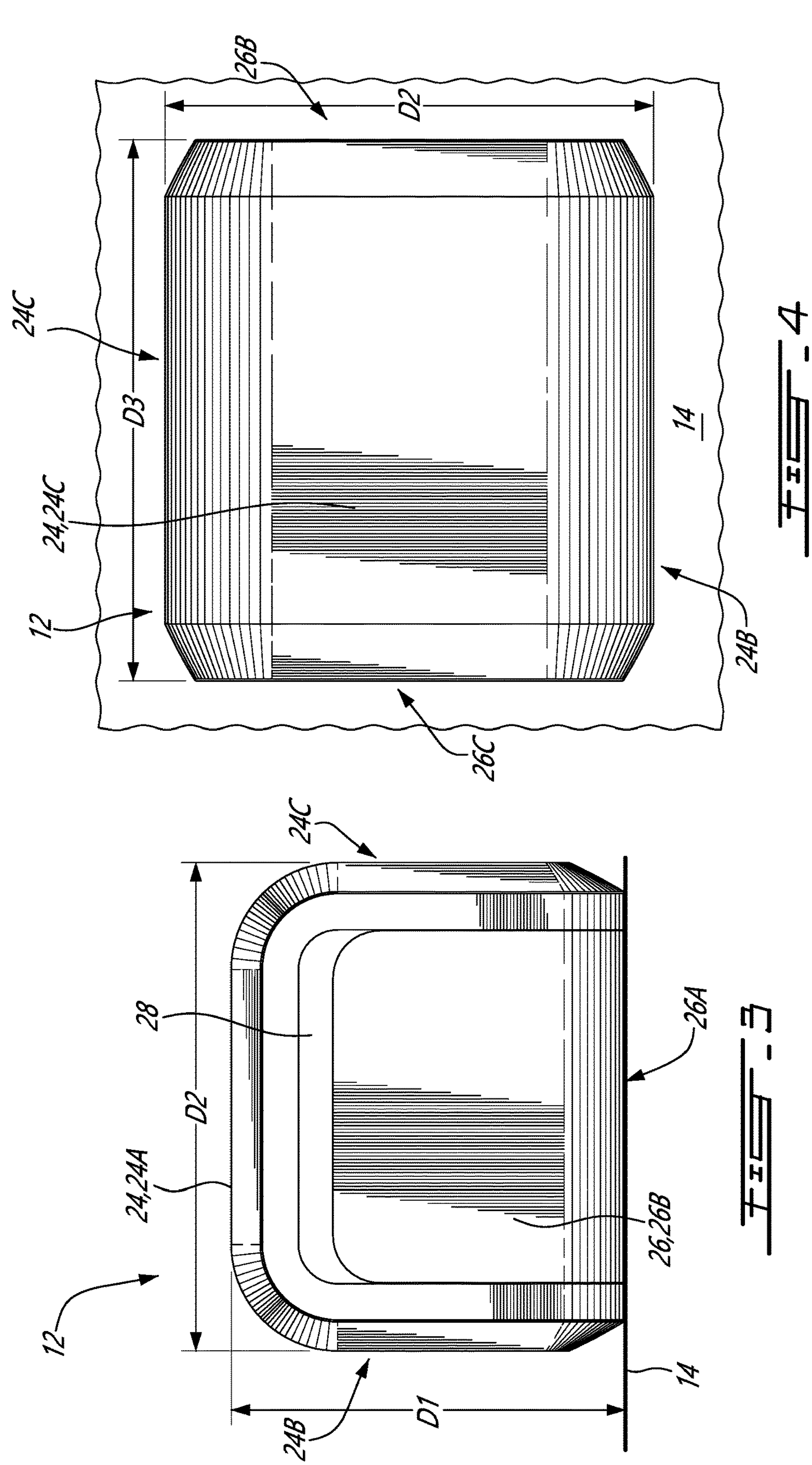
FIG. 3 is a side view of the ottoman.
FIG. 4 is a top view of the ottoman.

FIG. 3 is a side view of ottoman 12 when in the in-use orientation illustrated in FIG. 2A. The opposite side of ottoman 12 may be configured as a mirror image of the side illustrated in FIG. 3.

FIG. 4 is a top view of ottoman 12 when in the in-use orientation illustrated in FIG. 2A.

Figure 5:
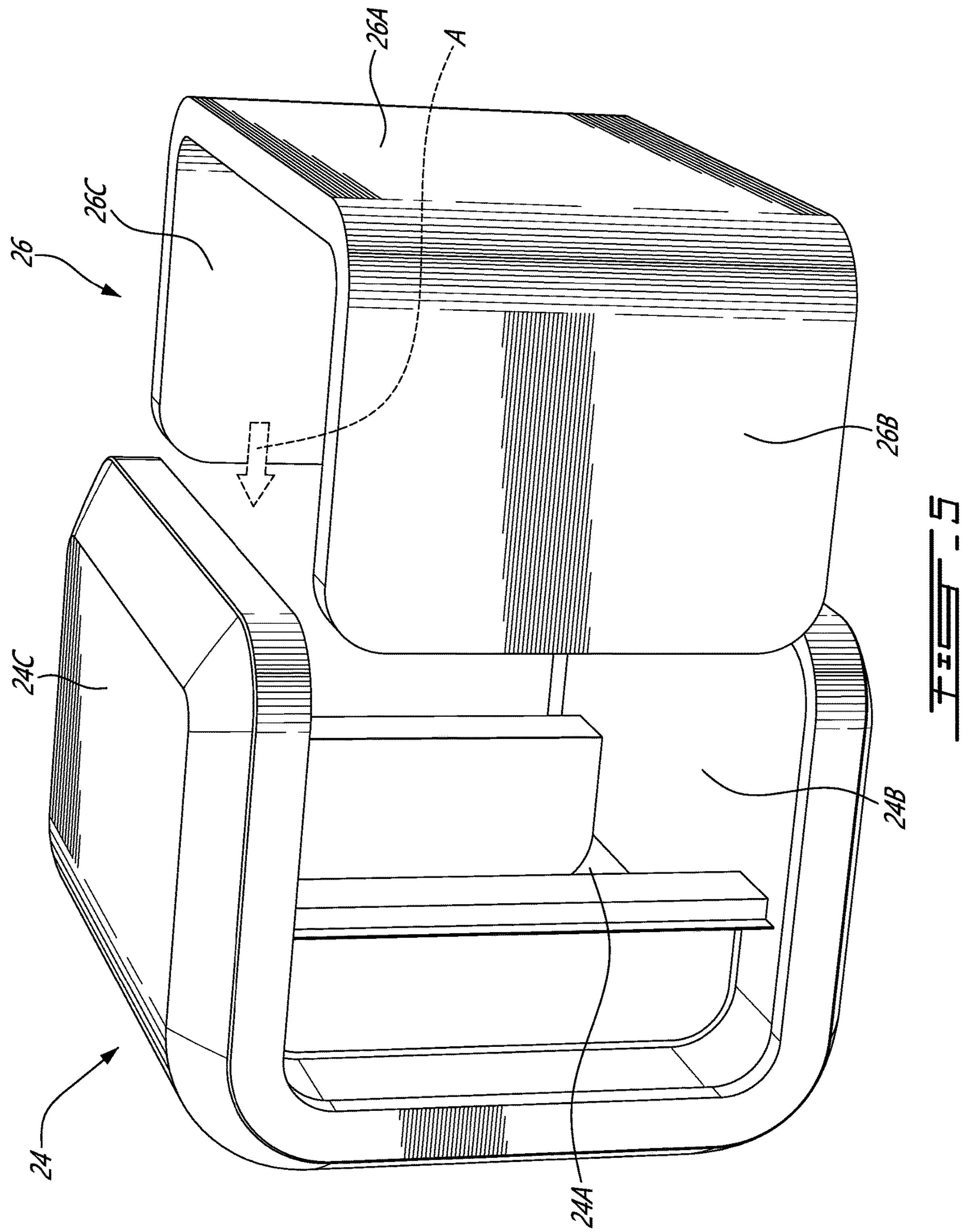
FIG. 5 is a perspective view of a first outer shell and a second outer shell being brought together during assembly of the ottoman.

FIG. 5 is a perspective view of first outer shell 24 and second outer shell 26 (shown schematically) and being brought together during assembly of ottoman 12. In some embodiments, first outer shell 24 and second outer shell 26 may be manufactured as separate components that are subsequently assembled (e.g., fastened) together to define ottoman 12. During assembly, first outer shell 24 and second outer shell 26 may be oriented so that first base 24A is opposing (i.e., facing) and spaced apart from second base 26A and first sides 24B, 24C are perpendicular to second sides 26B, 26B. In some embodiment, the first U shape of first outer shell 24 may be larger than the second U shape of second outer shell 26. When first outer shell 24 and second outer shell 26 are fitted together by moving second outer shell 26 along arrow A for example, second sides 26B, 26C of second outer shell 26 may be received between first sides 24B, 24C of first outer shell 24.

Figure 6:
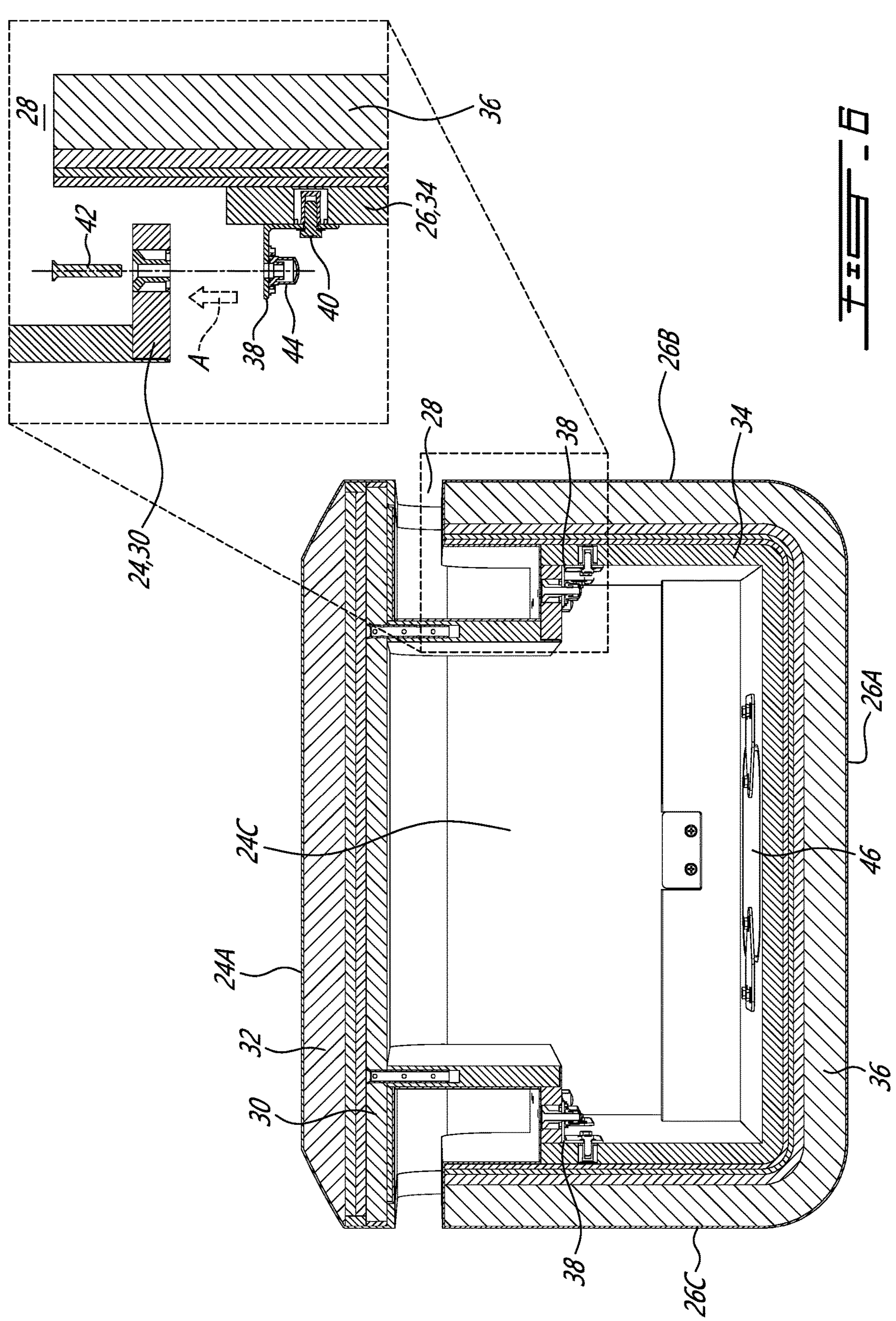
FIG. 6 is a cross-sectional view of the ottoman taken along line 6-6 in FIG. 2A.

FIG. 6 is a cross-sectional view of ottoman 12 taken along line 6-6 in FIG. 2A to illustrate the construction of ottoman 12. First outer shell 24 may include first frame 30 and optional first upholstery 32 covering first frame 30. Similarly, second outer shell 26 may include second frame 34 and optional second upholstery 36 covering second frame 34. In various embodiments, first and second frames 30, 34 may be made from a suitable solid wood, engineered wood product (e.g., composite panel), polymer, metal, or a combination of suitable construction materials. In various embodiments, first and second frames 30, 34 may each be an assembly of parts such as panels that are attached together using wood joinery, glue, fasteners (e.g., pins, dowels, bolts, screws) and/or brackets for example. Alternatively, first and second frames 30, 34 may each have a unitary (i.e., monolithic) construction made from a suitable molding process for example. In various embodiments, first and second upholsteries 32, 36 may each include a suitable foam or other cushioning material covered with a suitable fabric, vinyl, leather and/or suede for example. In some embodiments, first frame 30 and/or second frame 34 may not necessarily be upholstered.

In some embodiments, first outer shell 24 and second outer shell 26 may be fabricated and upholstered prior to being assembled together via one or more brackets 38 defining an interface for attaching first outer shell 24 and second outer shell 26 together. In some embodiments, brackets 38 may be L-shaped brackets. The inset shown in FIG. 6 provides a detailed and partially exploded view illustrating the attachment of first outer shell 24 with second outer shell 26 during final assembly of ottoman 12. For example, bracket 38 may first be attached to second frame 34 of second outer shell 26 using one or more screws 40 (with or without an anchor) and/or other suitable fastener(s) securing bracket 38 to second frame 34. Then, first outer shell 24 and second outer shell 26 may be brought together (e.g., by moving second outer shell 26 along arrow A). First frame 30 may engage bracket 38 and first frame 30 may be then attached to bracket 38 using one or more bolts 42, screw or and/or other suitable fastener(s). Bolt(s) 42 may engage directly or indirectly with first frame 30 and be threaded in respective threaded receptacle(s) 44 (e.g., threaded hole or nut) integral to or attached to bracket 38. Bolt(s) 42 may be accessible via handle 28 to permit bolt(s) 42 to be concealed from view while remaining accessible for installation and removal using suitable tool(s) via handle 28.

In some embodiments, second frame 34 may have access panel 46 formed in a region of second base 26A. Access panel 46 may permit the adjustment (e.g., rigging) and/or installation of brackets 38 and/or of other components of ottoman 12 prior to upholstery of second outer shell 26. For example, first frame 30 and second frame 34 may be brought together and brackets 38 may be adjusted and/or attached to second frame 34 via access panel 46. Once brackets 38 are installed, access panel 46 may be secured in place (e.g., via fasteners, clips and/or straps), second frame 34 may be upholstered and then first outer shell 24 may be attached to second outer shell 26 as explained above.

Figure 7:
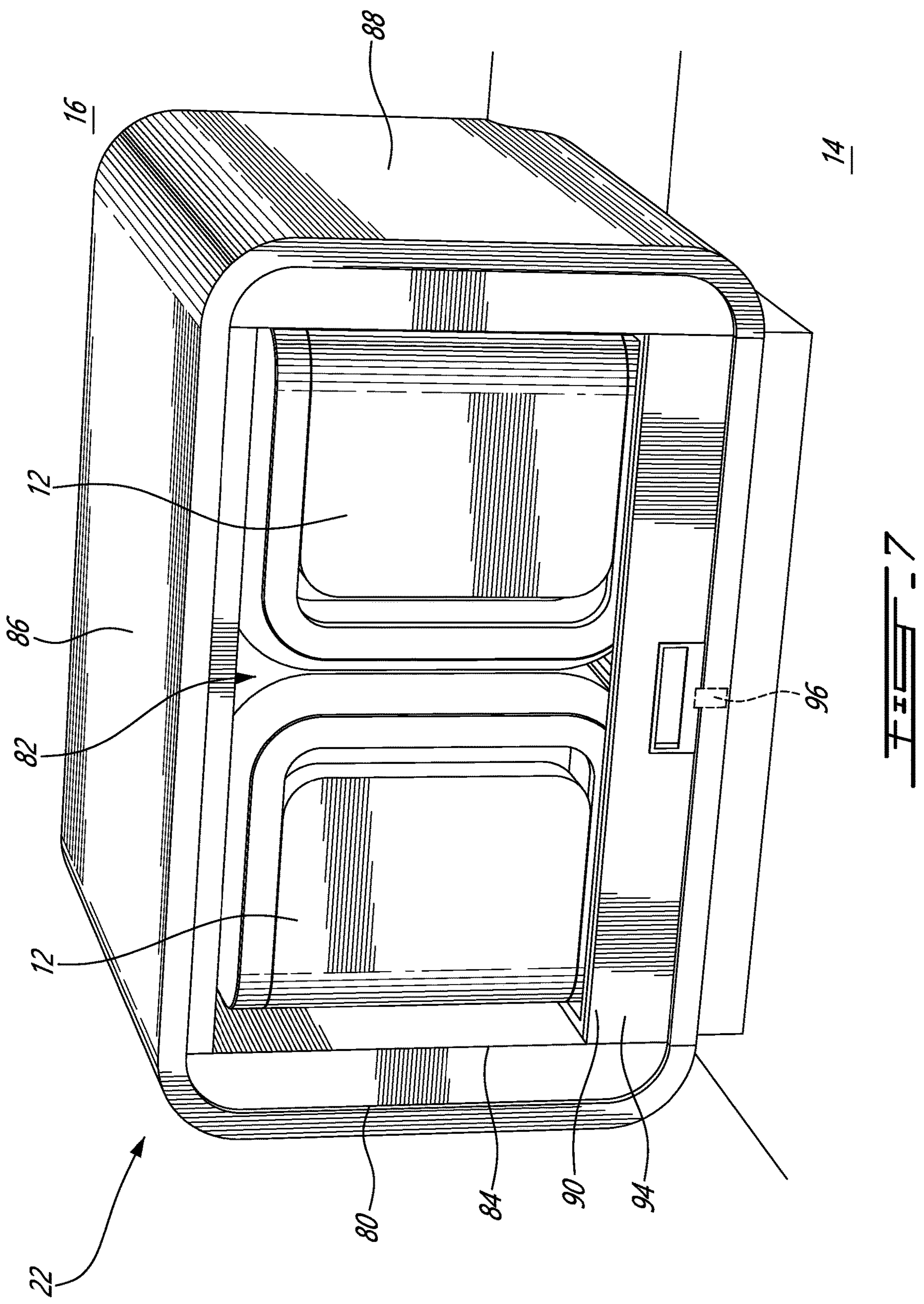
FIG. 7 is a perspective view of an ottoman storage cabinet with two ottomans stored therein.

FIG. 7 is a perspective view of an exemplary ottoman storage cabinet 22 (referred hereinafter as "cabinet 22") with two ottomans 12 stored therein. In various embodiments cabinet 22 may be configured to store one or more (e.g., two) ottomans 12 as described herein or other types of ottomans. Together cabinet 22 and one or more ottomans 12 stored therein may be considered an article of furniture incorporated into aircraft cabin 10. Cabinet 22 may include cabinet frame 80 defining storage volume 82 therein and opening 84 permitting access to storage volume 82. Cabinet frame 80 may serve as a carcass of cabinet 22. Cabinet frame 80 may be made of solid wood, engineered wood product (e.g., composite panel(s)) or other material suitable for furniture building. A suitable veneer or other finishing material (e.g., leather, fabric) may be applied to outer surfaces of cabinet 22 such as top 86 and/or sides 88. In various embodiments, top 86 of cabinet 22 may be used as a table, counter or bench for example.

Cabinet 22 may include one or more drawers 90 (referred hereinafter in the singular) to facilitate the storage and withdrawal of ottoman(s) 12 into/from storage volume 82 of cabinet 22. Drawer 90 may include ottoman carrier 92 (shown in FIGS. 8 and 9 for supporting ottoman(s) 12 and shuttling ottoman(s) 12 in and out of storage volume 82 via opening 84. Drawer 90 may be movable in and out of opening 84 defined by cabinet frame 80 between a stowed position as shown in FIG. 7 where ottoman carrier 92 is partially or entirely received into storage volume 82 and a deployed position as shown in FIGS. 8 and 9 where ottoman carrier 92 is at least partially outside of storage volume 82.

Drawer 90 may include drawer front 94 for retaining ottoman(s) 12 into storage volume 82 during transit of the aircraft. In some embodiments, drawer front 94 may be relatively shallow so that ottoman(s) 12 may remain visible via opening 84. In some embodiments, drawer front 94 may cover less than half of the area of opening 84 when drawer 90 is stowed. In some embodiments, drawer front 94 may be disposed in a bottom region of opening 84. In some embodiments, drawer 90 may be movable horizontally relative to cabinet frame 80 when cabinet 22 is in the in-use orientation shown in FIG. 7.

In some embodiments, cabinet 22 may include latch 96 shown schematically for selectively and releasably locking drawer 90 to cabinet frame 80. Latch 96 may prevent unintended opening of drawer 90 during flight for example. In some embodiments, latch 96 may be manually actuatable.

Figure 8:
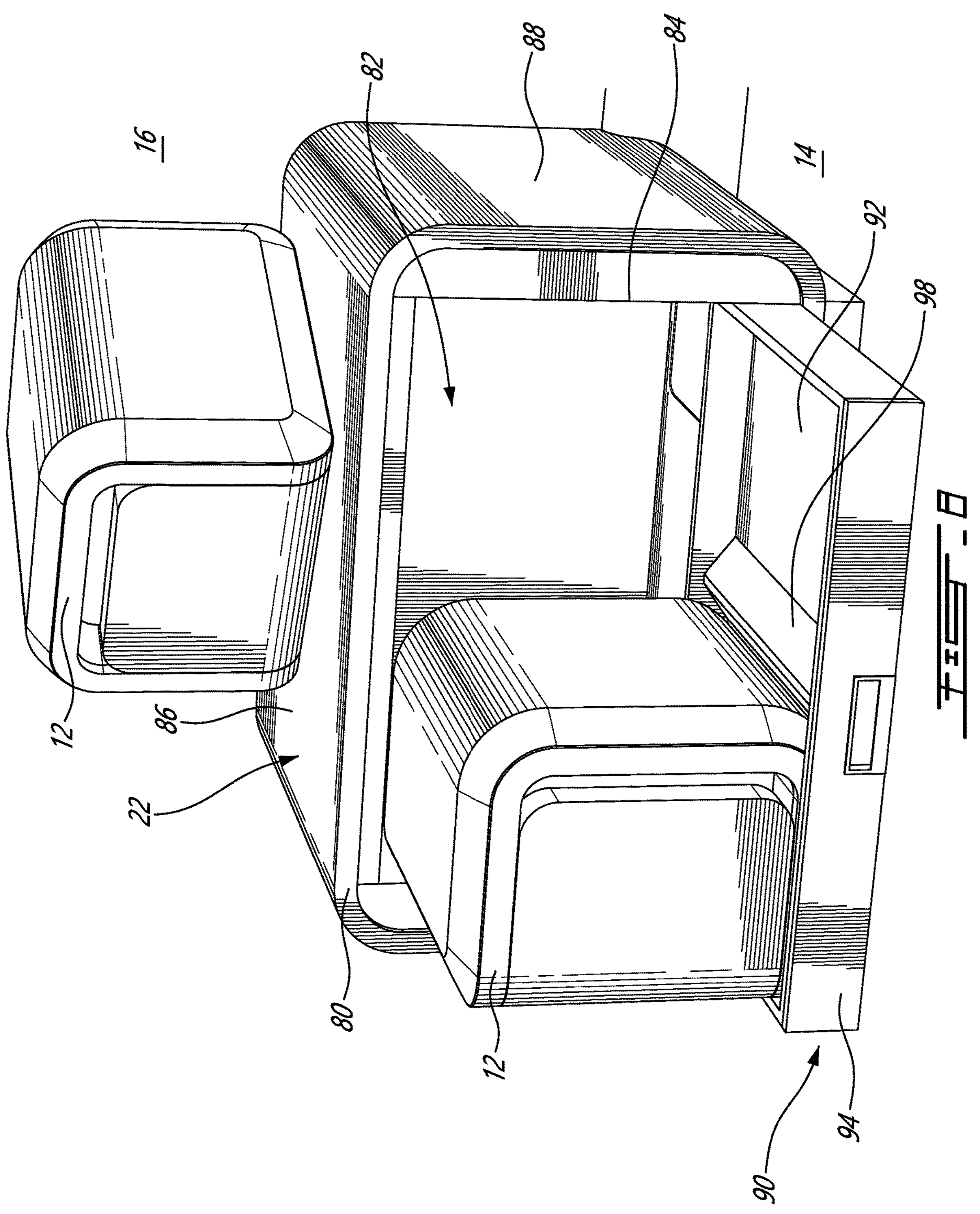
FIG. 8 is a perspective view of the ottoman storage cabinet of FIG. 5 with a drawer thereof drawn out to facilitate retrieval of the ottomans from the ottoman storage cabinet and placement of the ottomans into the ottoman storage cabinet.
Figure 8:
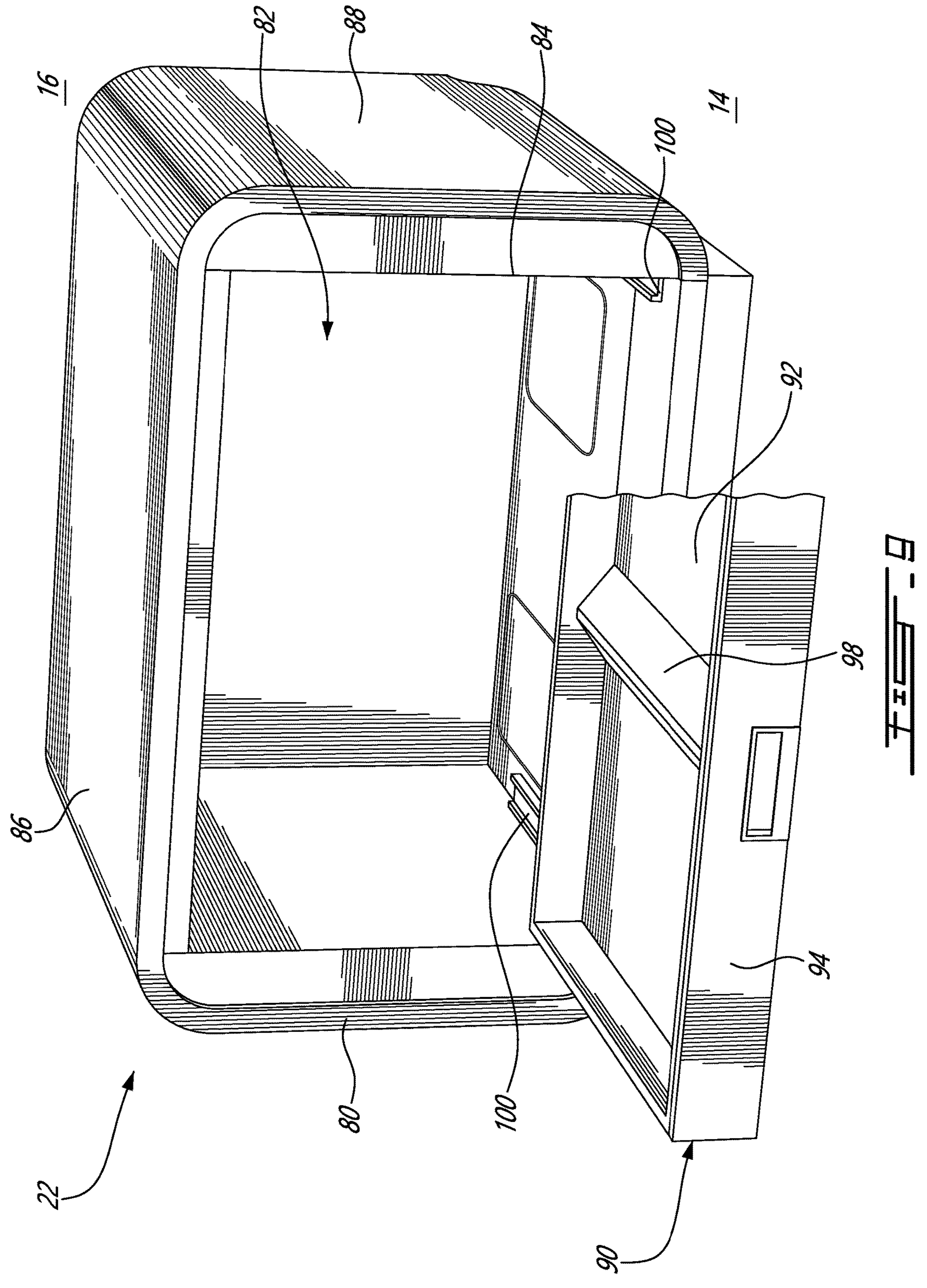

FIG. 8 is a perspective view of ottoman storage cabinet 22 of FIG. 7 with drawer 90 thereof drawn out (open) to permit retrieval of ottoman(s) 12 from ottoman storage cabinet 22 or placement of ottoman(s) 12 into ottoman storage cabinet 22. In some embodiments, ottoman carrier 92 may be include a tray which may be a flat, shallow container or receptacle with slightly raised edges for holding ottoman(s) 12. In some embodiments, the tray of ottoman carrier 92 may include a wedge-shaped divider 98 disposed between two ottomans 12 to delimit the respective resting locations of ottomans 12. The inner surfaces of drawer 90 and or of storage volume 82 may be lined with leather, suede, other fabric or finishing material(s) for example.

FIG. 9 is a perspective view of ottoman storage cabinet 22 of FIG. 7 with drawer 90 thereof being drawn out and partially cut away. In some embodiments, the movement of drawer 90 may be guided by way of one or more guides 100 (e.g., drawer slides).

The embodiments described in this document provide non-limiting examples of possible implementations of the present technology. Upon review of the present disclosure, a person of ordinary skill in the art will recognize that changes may be made to the embodiments described herein without departing from the scope of the present technology.

What is claimed is:

1. An ottoman comprising:

a first outer shell including a first base and two first sides extending from the first base to define a first U shape; and a second outer shell including a second base and two second sides extending from the second base to define a second U shape, the first outer shell and the second outer shell being fitted together so that:

the first base is opposing the second base;

the two first sides are perpendicular to the two second sides;

the two second sides are received between the two first sides; and a gap is defined between the first base of the first outer shell and one of the second sides of the second outer shell, the gap defining a first recessed handle for handling the ottoman, wherein:

the second base of the second outer shell defines a first floor-engaging surface for using the ottoman in a first orientation;

one of the first sides of the first outer shell defines a second floor-engaging surface for using the ottoman in a second orientation;

in the first orientation, the ottoman has a first overall height; and in the second orientation, the ottoman has a second overall height greater than the first overall height.

2. The ottoman as defined in claim 1, wherein a second gap is defined between the first base of the first outer shell and another of the second sides of the second outer shell, the second gap defining a second recessed handle for handling the ottoman.

3. The ottoman as defined in claim 1, wherein a first overall dimension of the ottoman along a first direction perpendicular to the first base of the first outer shell is different from a second overall dimension of the ottoman along a second direction perpendicular to the first direction.

4. The ottoman as defined in claim 3, wherein the first overall dimension is smaller than the second overall dimension.

5. The ottoman as defined in claim 4, wherein the second overall dimension is perpendicular to the first sides of the first outer shell.

6. The ottoman as defined in claim 4, wherein the first overall dimension is between 50% and 90% of the second overall dimension.

7. The ottoman as defined in claim 4, wherein the first overall dimension is between 70% and 89% of the second overall dimension.

8. The ottoman as defined in claim 1, wherein the first outer shell and the second outer shell are fitted together to cooperatively define a cuboid.

9. An aircraft cabin comprising:

a floor; and an ottoman resting on the floor, the ottoman including:

a first outer shell including a first base and two opposing first sides extending from the first base to define a first U shape; and a second outer shell including a second base and two opposing second sides extending from the second base to define a first U shape, the first outer shell and the second outer shell being fitted together so that:

the first base is opposing the second base;

the two opposing first sides are perpendicular to the two opposing second sides; and the two opposing second sides are received between the two opposing first sides;

wherein:

in a first in-use orientation of the ottoman, the ottoman has a first overall height from the floor; and in a second in-use orientation of the ottoman perpendicular to the first in-use orientation, the ottoman has a second overall height from the floor different from the first overall height.

10. The aircraft cabin as defined in claim 9, wherein a gap is defined between the first base of the first outer shell and one of the two opposing second sides of the second outer shell, the gap defining a recessed handle for handling the ottoman.

11. The aircraft cabin as defined in claim 9, comprising an ottoman storage cabinet for storing the ottoman.

* * * * *